(12) United States Patent
Rhee et al.

(10) Patent No.: US 11,463,539 B2
(45) Date of Patent: Oct. 4, 2022

(54) ELECTRONIC DEVICE FOR TRANSMITTING AND RECEIVING DATA WITH SERVER DEVICE

(71) Applicant: Samsung Electronics Co., Ltd., Gyeonggi-do (KR)

(72) Inventors: Sungmin Rhee, Gyeonggi-do (KR); Sungdeuk Park, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/136,953

(22) Filed: Dec. 29, 2020

(65) Prior Publication Data
US 2021/0203748 A1 Jul. 1, 2021

(30) Foreign Application Priority Data
Dec. 30, 2019 (KR) .................... 10-2019-0177910

(51) Int. Cl.
*H04L 29/08* (2006.01)
*H04L 67/306* (2022.01)
(Continued)

(52) U.S. Cl.
CPC .......... *H04L 67/306* (2013.01); *G06K 9/6228* (2013.01); *G06N 20/00* (2019.01); *H04L 67/10* (2013.01)

(58) Field of Classification Search
CPC ....... H04L 67/306; H04L 67/10; H04L 67/12; G06K 9/6228; G06N 20/00;
(Continued)

(56) References Cited

U.S. PATENT DOCUMENTS 10,129,718 B2 11/2018 Dulick
10,706,453 B1 * 7/2020 Morin .................... G06N 20/20
(Continued)

FOREIGN PATENT DOCUMENTS

KR 10-2014-0101177 8/2014
KR 10-2016-0041146 4/2016

OTHER PUBLICATIONS

Recommendation and Classification Systems: A Systematic Mapping StudyEnríquez, J G; Morales-Trujillo, L; Calle-Alonso, Fernando; Domínguez-Mayo, F J; Lucas-Rodríguez, J M. Scientific Programming 2019 New York: Hindawi Limited. (2019) (Year: 2019).*

*Primary Examiner* — Michael Won
(74) *Attorney, Agent, or Firm* — The Farrell Law Firm, P.C.

(57) ABSTRACT

An electronic device that includes a communication module and a processor operatively connected to the communication module to exchange data with an external electronic device through the communication module is provided. The processor generates user data and a user profile based on collected user information related to a plurality of items, receive learning information data related to the plurality of items from the external electronic device, generate user learning data by applying the learning information data to the user data, learn a user preference pattern based on the user learning data, update the user profile based on the learned user preference pattern, and receive recommended item data from the external electronic device based on the updated user profile.

12 Claims, 9 Drawing Sheets

(51) Int. Cl.
*G06K 9/62* (2022.01)
*G06N 20/00* (2019.01)
*H04L 67/10* (2022.01)

(58) Field of Classification Search
CPC ......... H04M 1/72403; H04M 2201/34; H04M 2201/36; H04M 2201/38
See application file for complete search history.

(56) References Cited

U.S. PATENT DOCUMENTS

| | | | | |
|---|---|---|---|---|
| 10,796,238 | B2* | 10/2020 | Chawla | G06N 5/04 |
| 11,017,688 | B1* | 5/2021 | Arazi | G06Q 30/0249 |
| 2013/0173337 | A1* | 7/2013 | Evans | G06Q 30/02 705/7.29 |
| 2013/0204825 | A1* | 8/2013 | Su | G06N 20/00 706/46 |
| 2017/0372197 | A1* | 12/2017 | Baughman | A23L 33/30 |
| 2018/0174070 | A1* | 6/2018 | Hoffman | G06T 11/00 |
| 2018/0352091 | A1* | 12/2018 | Puri | H04M 7/0036 |
| 2019/0053019 | A1 | 2/2019 | Dulick | |
| 2019/0108353 | A1* | 4/2019 | Sadeh | G06N 20/20 |
| 2019/0325498 | A1* | 10/2019 | Clark | G06Q 30/0625 |
| 2020/0193502 | A1* | 6/2020 | Smith | G06N 20/00 |
| 2020/0217677 | A1* | 7/2020 | Wang | G01C 21/3415 |
| 2020/0244605 | A1* | 7/2020 | Nagaraja | H04L 67/16 |
| 2020/0321123 | A1* | 10/2020 | Neumann | G16H 50/20 |
| 2020/0327604 | A1* | 10/2020 | Morin | G06N 5/003 |
| 2020/0364588 | A1* | 11/2020 | Knox | H04L 67/12 |
| 2020/0387812 | A1* | 12/2020 | Lewis | G06N 5/04 |
| 2021/0012267 | A1* | 1/2021 | Fawaz | G06N 20/20 |
| 2021/0081377 | A1* | 3/2021 | Polled | G06F 16/9024 |
| 2021/0081819 | A1* | 3/2021 | Polled | G06F 40/40 |
| 2021/0089603 | A1* | 3/2021 | Abbasi Moghaddam | G06F 16/906 |

* cited by examiner

ELECTRONIC DEVICE FOR TRANSMITTING AND RECEIVING DATA WITH SERVER DEVICE

CROSS-REFERENCE TO RELATED APPLICATIONS

This application is based on and claims priority under 35 U.S.C. § 119 to Korean Patent Application No. 10-2019-0177910, filed on Dec. 30, 2019, in the Korean Intellectual Property Office, the disclosure of which is incorporated by reference herein in its entirety.

BACKGROUND

1. Field

The present disclosure relates generally to a technology for transmitting and receiving data to and from a server device in an electronic device.

2. Description of Related Art

Due to the development of the information technology (IT) industry and the rapid increase of Internet users, the performance of electronic devices such as servers and computers has improved, and the amount of data transmission between networks and terminals is increasing. In addition, users may collect a wide variety of information that is difficult to compare with past information. Accordingly, demand has increased for a technology that accurately determines whether any information is useful information among a number of pieces of information, and selects and provides only necessary information.

An electronic device of a user may be connected to a server device through a network and may receive various services from the server device. The server device may collect user metadata or user context information from the electronic device of the user in order to provide a user-customized service. However, in the process of collecting such information, there is a possibility that personal information of the user may be leaked, and the amount of unnecessary data transmission may increase to collect the user's metadata.

SUMMARY

The present disclosure has been made to address the above-mentioned problems and disadvantages, and to provide at least the advantages described below.

In accordance with an aspect of the disclosure, an electronic device includes a communication module, and a processor operatively connected to the communication module to exchange data with an external electronic device through the communication module. The processor may generate user data and a user profile based on collected user information related to a plurality of items, receive learning information data related to the plurality of items from the external electronic device, generate user learning data by applying the learning information data to the user data, learn a user preference pattern based on the user learning data, update the user profile based on the learned user preference pattern, and receive recommended item data from the external electronic device based on the updated user profile.

In accordance with another aspect of the disclosure, an electronic device includes a communication module, and a processor operatively connected to the communication module to exchange data with an external electronic device through the communication module. The processor may receive a request for transmission of recommended item data from the external electronic device, and determine a data transmission amount of the recommended item data based on an item type and an item preference included in the request for transmission.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

An aspect of the disclosure is to provide an electronic device capable of selectively receiving information about an item from a server by learning a user interest pattern.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
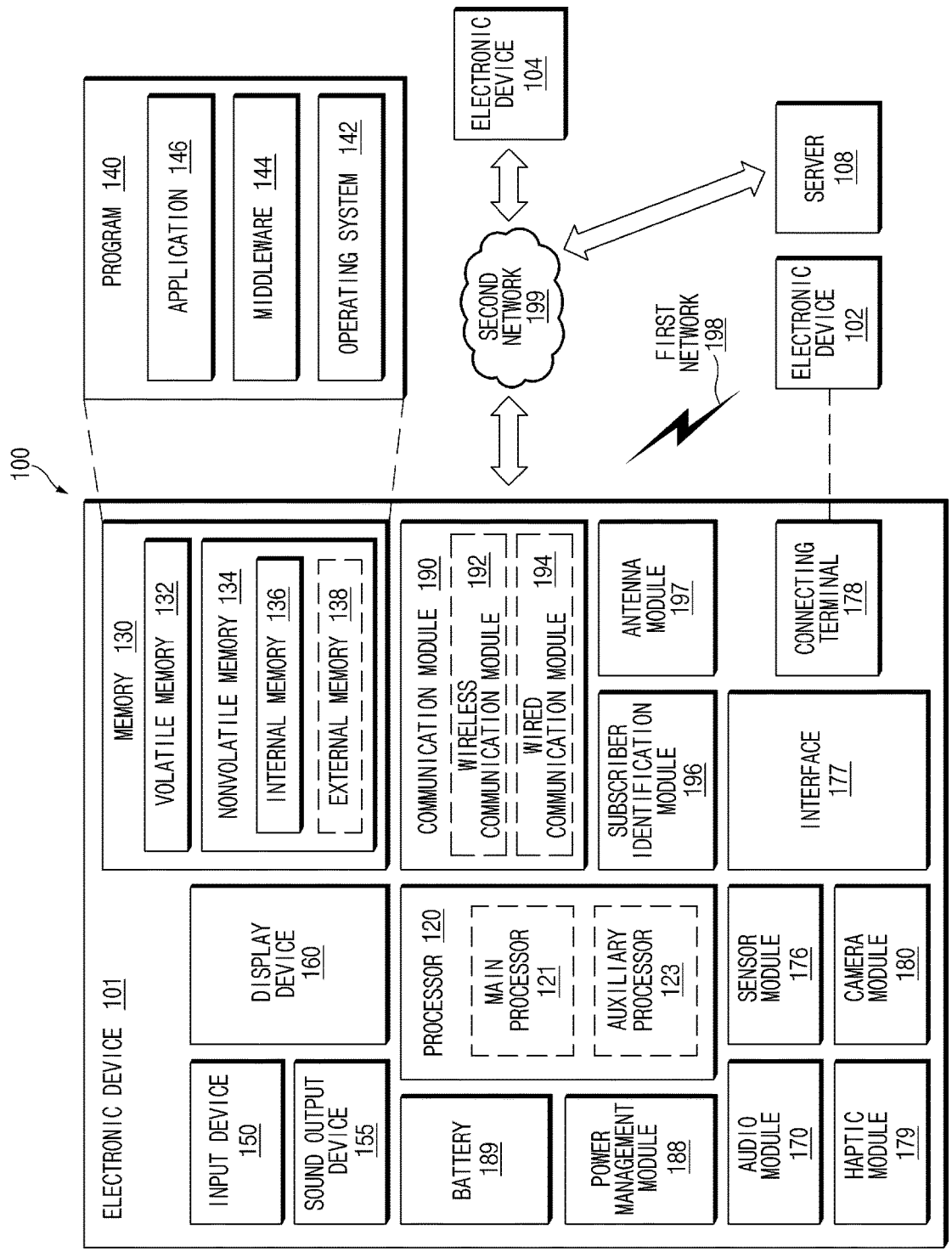
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
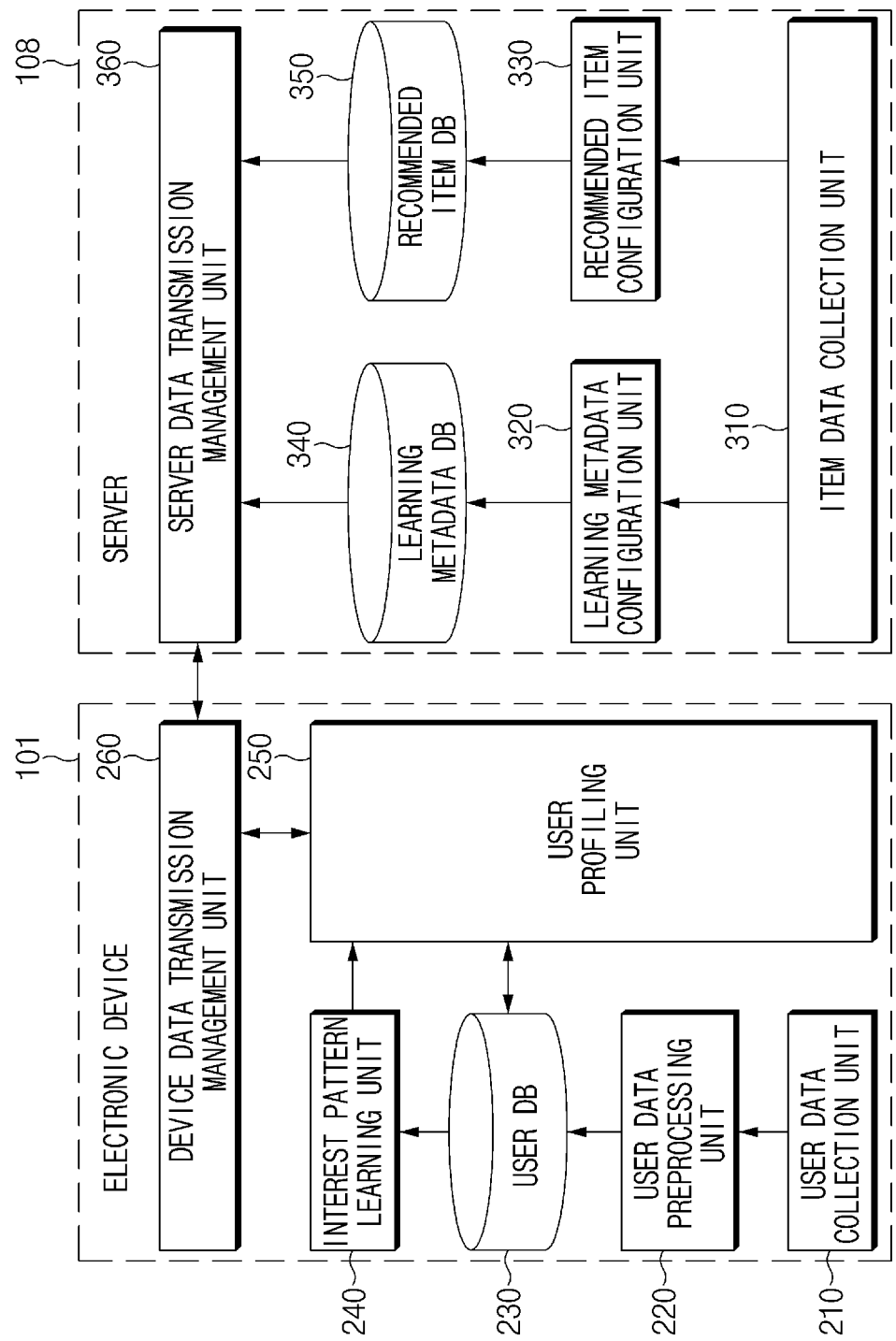
FIG. 2 is a block diagram illustrating a configuration of an electronic device and a configuration of a server, according to an embodiment.
Figure 3:
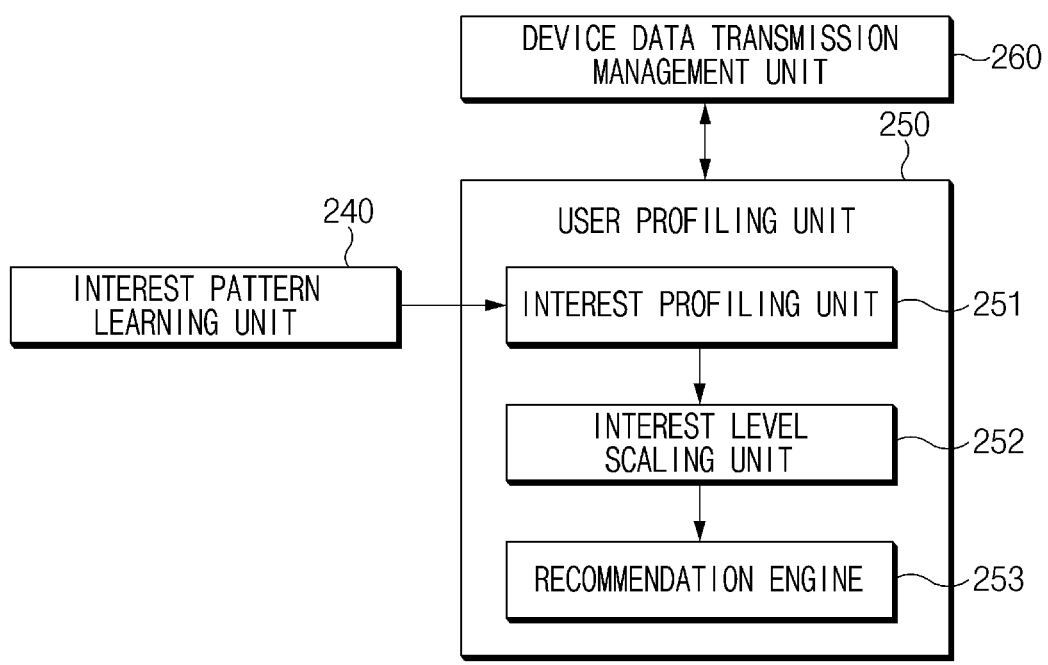
FIG. 3 is a block diagram illustrating a configuration of the user profiling unit of FIG. 2, according to an embodiment.

FIG. 2 is a block diagram illustrating a configuration of an electronic device and a configuration of a server, according to an embodiment. FIG. 3 is a block diagram illustrating a configuration of the user profiling unit of FIG. 2, according to an embodiment.

Referring to FIG. 2, the electronic device 101 includes a user data collection unit 210, a user data preprocessing unit 220, a user database (DB) 230, an interest pattern learning unit 240, a user profiling unit 250, and a device data transmission management unit 260. The server 108 includes an item data collection unit 310, a learning metadata configuration unit 320, a recommended item configuration unit 330, a learning metadata DB 340, a recommended item DB 350, and a server data transmission management unit 360.

The user data collection unit 210 may collect user basic data. The user basic data may include a user's activity record (e.g., a user's use item, an item use record (e.g., a news browsing record or a map browsing record), or a user input feedback). The user data preprocessing unit 220 may generate user data by classifying the user basic data based on specific criteria (e.g., an item type and item use time).

The user DB 230 may store the user data and context information (e.g., date, time or place information on which the user searches for an item, or information on the user's gender or age) related to the user data. In addition, the user DB 230 may store a user profile. For example, the user profile may include information related to a user's interest in each item. The user profile may be initially generated and stored to have a low level of detail for various types of items. As the interest pattern learning unit 240 proceeds the learning of the user interest pattern model, the user profile may be updated by the user profiling unit 250. In the updated user profile, the types of the selected items may decrease, and the detail of the selected item may increase. The user DB 230 may store learning metadata related to an item included in the user data. The learning metadata may be received from the server 108 by the device data transmission management unit 260 and stored in the user DB 230.

The interest pattern learning unit 240 may learn a user interest pattern model (e.g., a machine learning model) based on the user data. The interest pattern learning unit 240 may receive the user data, the context information, the user profile, and the learning metadata from the user DB 230. The interest pattern learning unit 240 may configure user learning data based on the user data, the context information, the user profile, and the learning metadata. The interest pattern learning unit 240 may learn the user interest pattern model by using the user learning data. The user interest pattern model may be formed based on a supervised learning methodology (e.g., a multi-layer perceptron or a support vector machine), reinforcement learning methodology, a sequence data learning algorithm e.g., recurrent neural networks (RNN) or a long short-term memory network (LSTM)), or an attention-based learning algorithm.

The user profiling unit 250 may include an interest profiling unit 251, an interest level scaling unit 252, and a recommendation engine 253. The user profiling unit 250 may update the user profile based on the user interest pattern model. The interest profiling unit 251 may exclude items having low user interest levels from the user profile and reduce the type of item (or select an item). The interest level scaling unit 252 may increase the detail of the selected item. The interest level scaling unit 252 may add a sub-item to the selected item. The recommendation engine 253 may request a recommended item from the device data transmission management unit 260 based on the updated user profile. The recommendation engine 253 may provide the recommended item received from the device data transmission management unit 260 to a user through various applications (e.g., a news app or a map app).

The device data transmission management unit 260 may request learning metadata or recommended item data from the server data transmission management unit 360 based on the user profile. For example, the user profile may be continuously updated through the interest pattern learning unit 240 and the user profiling unit 250. As the user profile is updated, the types of items included in the user profile may decrease, and the details of items included in the user profile may increase. Accordingly, the amount of data transmitted between the electronic device 101 and the server 108 may be reduced based on the user's interest level.

The item data collection unit 310 may collect data related to an item (hereinafter, item data) through various paths (e.g., a social network service (SNS), a blog, or the Web). The learning metadata configuration unit 320 or the recommended item configuration unit 330 may infer information of an item with which the item data is associated. The learning metadata configuration unit 320 may configure learning metadata by classifying the item data based on the inference result. In addition, the recommended item configuration unit 330 may configure the recommended item data by classifying the item data based on the inference result. The learning metadata configuration unit 320 may store the learning metadata in the learning metadata DB 340. The recommended item configuration unit 330 may store the recommended item data in the recommended item DB 350. The learning metadata or the recommended item data may include the same or a similar configuration.

The learning metadata or the recommended item data may include detail information (e.g., a tag related to an item, a popularity, or a rating) of each item. The learning metadata (e.g., learning information data) may include data required for learning of the user interest pattern model of the interest pattern learning unit 240 and data describing the data. The learning metadata may include data processed for learning in order to use the recommended item data in the interest pattern learning unit 240. For example, in the case of a news recommendation model, the learning metadata may include data related to news such as a list of news items consumed by a user, a press company of each news item, a category of each news item, and a date of each news item.

The recommended item configuration unit 330 and the learning metadata configuration unit 320 may be implemented as one metadata configuration unit. In addition, the recommended item DB 350 and the learning metadata DB 340 may be implemented as a single database.

Figure 4:
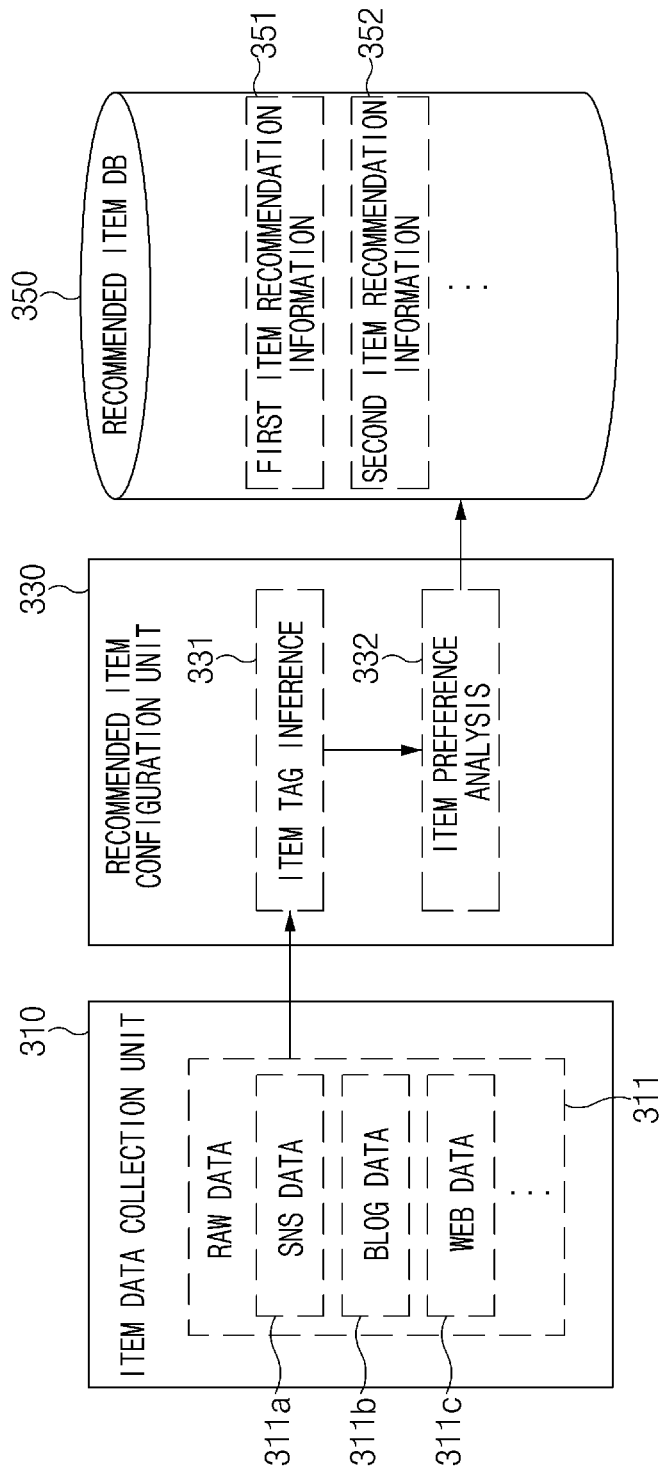
FIG. 4 is a block diagram illustrating a method of collecting and analyzing recommended items in a server, according to an embodiment.

FIG. 4 is a block diagram illustrating a method of collecting and analyzing recommended items in a server, according to an embodiment.

Referring to FIGS. 2 and 4, the server 108 includes the item data collection unit 310, the recommended item configuration unit 330, and the recommended item DB 350.

The item data collection unit 310 may collect item data 311 (e.g., raw data). The item data 311 may include first collected data 311a (e.g., SNS data), second collected data 311b (e.g., blog data), or third collected data 311c (e.g., web data). This is exemplary, and the item data 311 may include data from various sources.

The recommended item configuration unit 330 may configure a database of recommended items based on the item data 311. The recommended item configuration unit 330 may perform item tag inference 331 (e.g., inferring that each data is information related to which item) in the collected data (e.g., the first collected data 311a, the second collected data 311b, or the third collected data 311c). The recommended item configuration unit 330 may configure metadata e.g., first item recommendation information 351 and second item recommendation information 352) for each item through item preference analysis 332. The metadata may include a tag for each item (e.g., restaurant A—"it is good to go with children", "quiet", or "Korean food") or popularity. The recommended item configuration unit 330 may store the metadata in the recommended item DB 350 for each item.

The learning metadata configuration unit 320 of FIG. 2 may also configure the metadata required for learning of the electronic device 101 in the same as or like the recommended item configuration unit 330. The learning metadata configuration unit 320 may configure the learning metadata DB 340 based on the item data 311.

Figure 5:
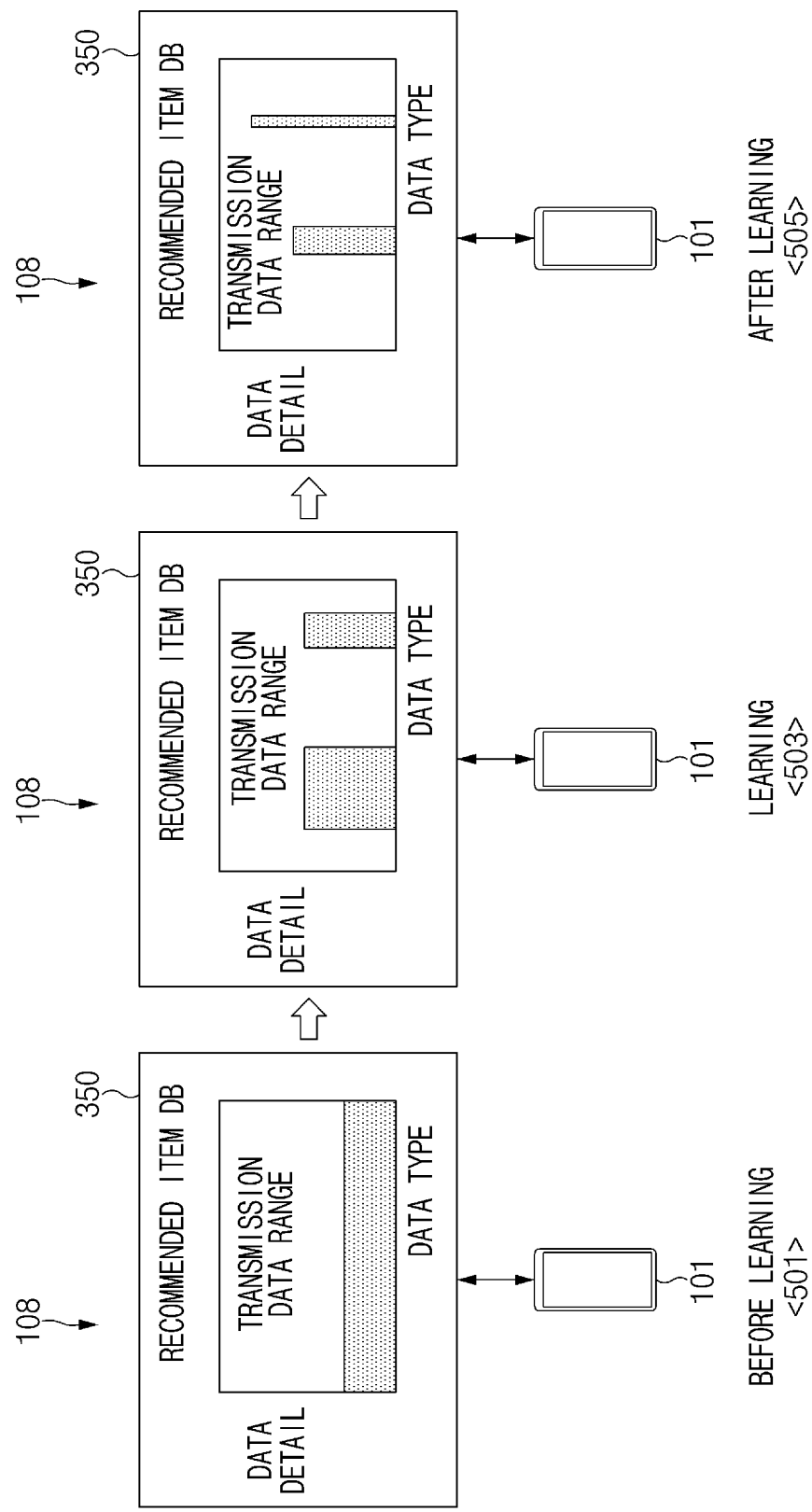
FIG. 5 is a diagram illustrating a range of transmission data between an electronic device and a server, according to an embodiment.

FIG. 5 is a diagram illustrating a range of transmission data between an electronic device and a server, according to an embodiment.

Referring to FIGS. 2 and 5, in response to a request of the electronic device 101 or the device data transmission management unit 260, the server 108 or the server data transmission management unit 360 may transmit recommended item data or learning metadata. The electronic device 101 may determine a transmission data range requested from the server 108 through learning of a user interest pattern model through the interest pattern learning unit 240. The transmission data range may be determined based on a data type and a data detail. The data type may mean an item type (e.g., locations of places in case of place recommendation and categories of news in case of news recommendation). The data detail may mean an information level (or scale) included in each item (e.g., rating, popularity, or review of each item).

In a pre-learning state 501 (e.g., a state before learning a user interest pattern model in the interest pattern learning unit 240 of the electronic device 101), the server 108 may receive a request for transmission of recommended item data (or learning metadata) from the electronic device 101. For example, in the pre-learning state 501, recommended item data (or ltearning, metadata) to have a first-level detail (or a lower-level detail that is lower than a learning state 503) for various types of data (or all types of data) may be transmitted in the transmission data range of the server 108. The information about an item in the first-level detail may include a name.

In the learning state 503 (e.g., a state of learning a user interest pattern model in the interest pattern learning unit 240 of the electronic device 101), the server 108 may receive a request for transmission of recommended item data (or learning metadata) from the electronic device 101. In the learning state 503, the recommended item data (or learning data) may be transmitted to have a second-level detail (or intermediate detail level that is higher than the pre-learning state 501 and lower than the post-learning state 505) in the transmission data range of the server 108. The information about an item in the second-level detail may include a name and popularity.

In the post-learning state 505 (e.g., a state after learning a user interest pattern model in the interest pattern learning unit 240 of the electronic device 101), the server 108 may receive, from the electronic device 101, a request for transmission of recommended item data (or learning metadata). In the post-learning state 505, the recommended item data (or the learning metadata) may be transmitted to have a third-level detail (or a high-level detail that is higher than in the learning state 501) for an item of a type that is reduced more than in the learning state 503 in the transmission data range of the server 108. Information about an item in the third-level detail may include a name, a popularity, and a review.

Figure 6:
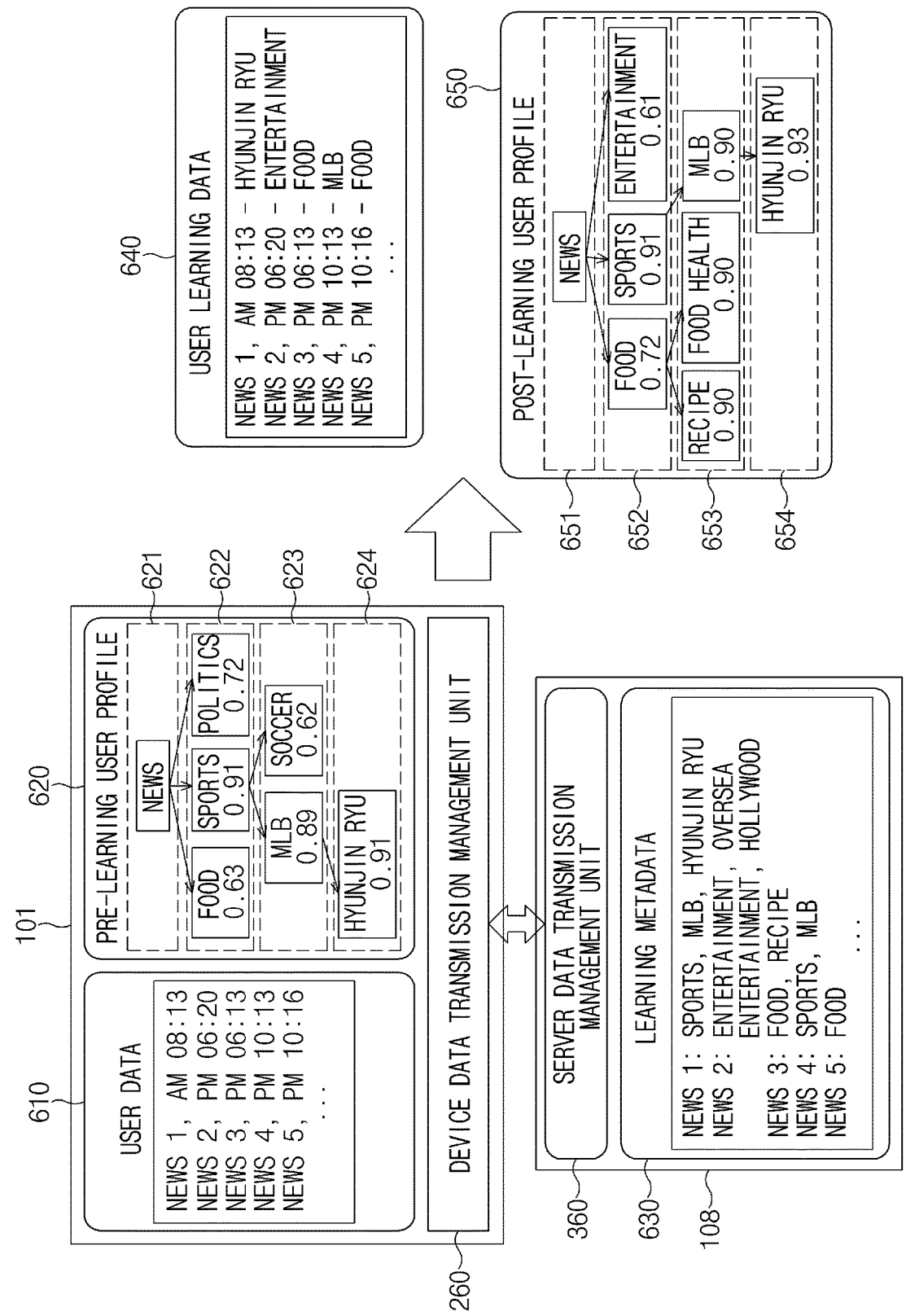
FIG. 6 is a diagram illustrating a method of learning a user interest pattern model in an electronic device, according to an embodiment.

FIG. 6 is a diagram illustrating a method of learning a user interest pattern model n an electronic device, according to an embodiment.

Referring to FIGS. 2 and 6, the interest pattern learning unit 240 of the electronic device 101 may learn a user interest pattern model based on user learning data 640. The electronic device 101 may request learning metadata 630 from the server 108 to generate the user learning data 640.

The device data transmission management unit 260 may request learning metadata from the server data transmission management unit 360 based on user data 610 and a pre-learning user profile 620. The user data 610 may include user activity information (e.g., news search history) or a user log record (e.g., News 1, AM 08:13). The pre-learning user profile 620 may include user interest information related to an item (e.g., news, food, sports, politics, major league baseball (MLB), soccer, or Hyunjin Ryu). The device data transmission management unit 260 may request the learning metadata 630 corresponding to the user data 610 from the server data transmission management unit 360. The server data transmission management unit 360 may transmit the learning metadata 630 related to the user data 610. The learning metadata 630 may include item information (e.g., News 1: sports, MLB, or Hyunjin Ryu) corresponding to the user log record of the user data 610.

The interest pattern learning unit 240 of the electronic device 101 may configure the user learning data 640 by using the user data 610 and the received learning metadata 630. The interest pattern learning unit 240 may generate user learning data 640 (e.g., News 1, AM 08:13—Ryu Hyun-jin) by combining the user log record and the learning metadata 630. The interest pattern learning unit 240 may learn the user interest pattern model based on the user learning data 640.

The user profiling unit 250 of the electronic device 101 may update a user profile based on the user interest pattern model. The user profiling unit 250 may update the pre-learning user profile 620 to a post-learning user profile 650. When the user profile is updated, an item included in the user profile may be changed, and user interest information of each item may be changed. The pre-learning user profile 620 may include a first item layer 621 (e.g., news), a second item layer 622 (e.g., food, sports, or politics), a third item layer 623 (e.g.: MLB or soccer) and a fourth item layer 624 (e.g., Hyunjin Ryu). The post-learning user profile 650 may include a first item layer 651 (e.g. news), a second item layer 652 (e.g. foods, sports, or entertainment), a third item layer 653 (e.g. recipe, food health, or NEB) and a fourth item layer 654 (e.g., Hyunjin Ryu), In addition, the level of user interest (e.g., food (0.63 →0.72)) of the item included in the post-learning user profile 650 may be changed.

Figure 7:
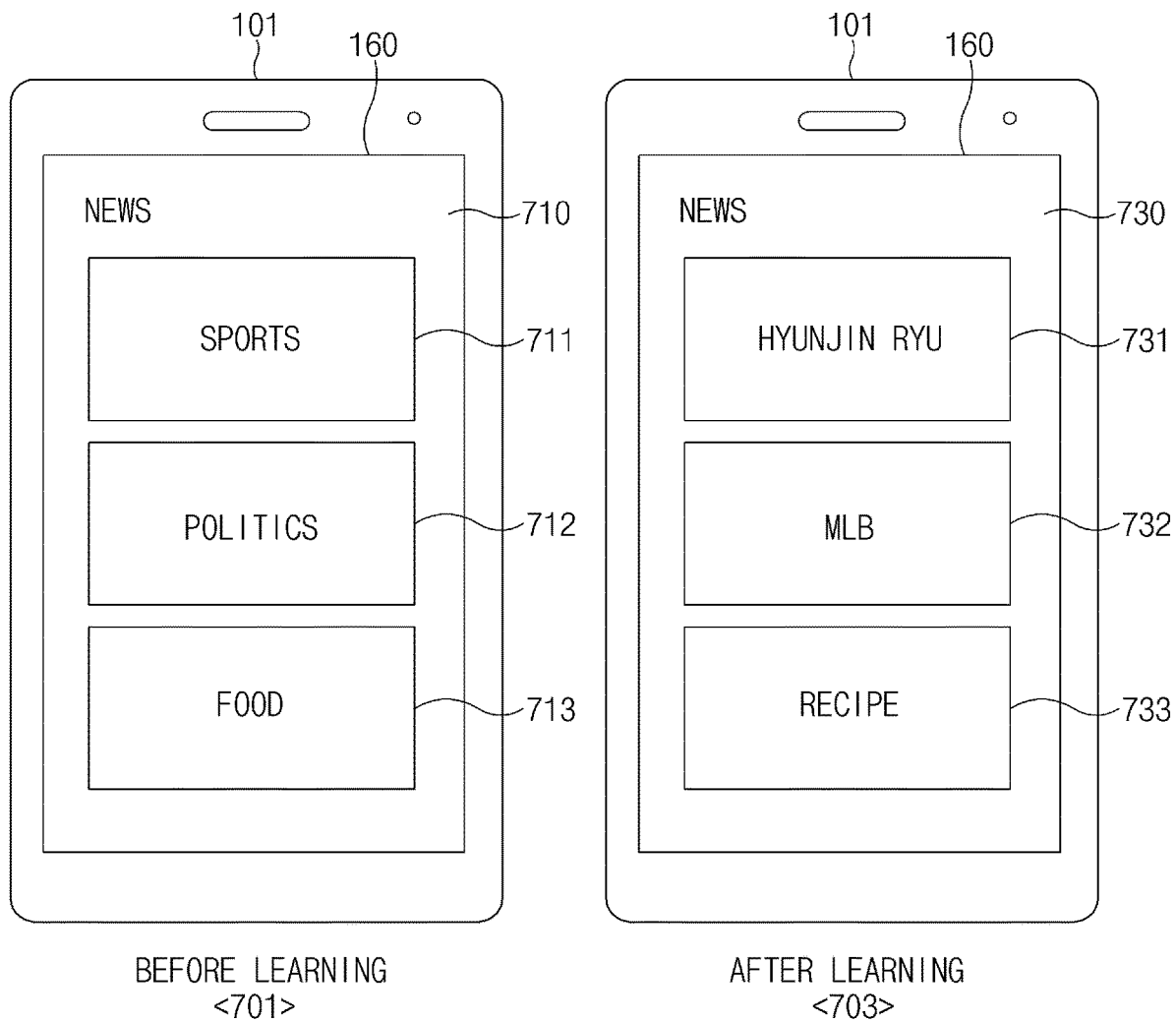
FIG. 7 is a diagram illustrating a method of displaying an item before and after learning a user interest pattern model in an electronic device, according to an embodiment.

FIG. 7 is a diagram illustrating a method of displaying an item before and after learning a user interest pattern model in an electronic device, according to an embodiment.

Referring to FIG. 7, the electronic device 101 may execute a specific application (e.g., a news app). In a pre-learning state 701, the electronic device 101 may display a first screen 710 on the display 160 when executing the specific application. The first screen 710 may display categories 711, 712 and 713, respectively related to sports, politics, and foods, belonging to the second item layer 622 (e.g., an upper level) in a pre-learning user profile 620.

In a post-learning state 703, the electronic device 101 may display a second screen 730 as the first screen on the display 160 when executing the specific application. The second screen 730 may display categories 731, 732 and 733, respectively related to Hyunjin Ryu, MLB, and recipe, belonging to the third item layer 653 and the fourth item layer 654 (e.g., lower layers) in a post-learning user profile 650.

Figure 8:
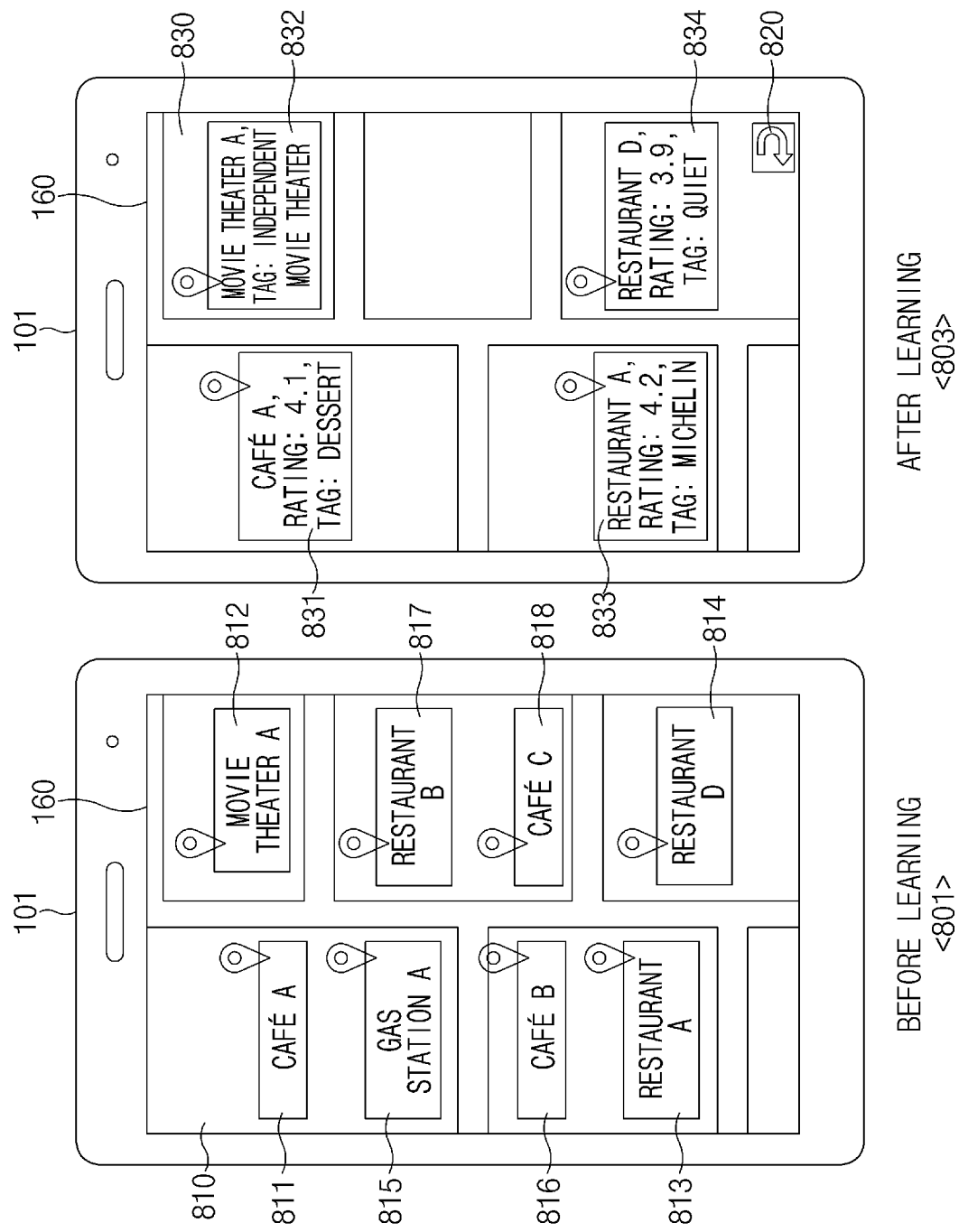
FIG. 8 is a diagram illustrating a method of displaying an item before and after learning a user interest pattern model in an electronic device, according to an embodiment.

FIG. 8 is a diagram illustrating a method of displaying an item before and after learning a user interest pattern model in an electronic device, according to an embodiment.

Referring to FIG. 8, the electronic device 101 may execute a specific application (e.g., a map app). In a pre-learning state 801, the electronic device 101 may display a first screen 810 as the first screen on the display 160 when executing the specific application. The first screen 810 may display high-level (or non-detail) information 811, 812, 813, 814, 815, 816, 817, and 818, respectively related to cafe A, gas station A, movie theater A, restaurant A, cafe B, restaurant B, cafe C, and restaurant D, based on a pre-learning user profile.

In a post-learning state 803, the electronic device 101 may display a second screen 830 as the first screen on the display 160 when executing the specific application. The second screen 830 may display a low-level (or detail) information 831, 832, 833 and 834, respectively related to cafe A, restaurant A, movie theater A, and restaurant D, based on a post-learning user profile The low-level (or detail) information 831, 832, 833 and 834 may include a recommended name, rating and tag. In the second screen 830, the specific application may display an object (e.g., a back button) capable of displaying information corresponding to a pre-learning user profile depending on a user input (e.g., a touch).

Figure 9:
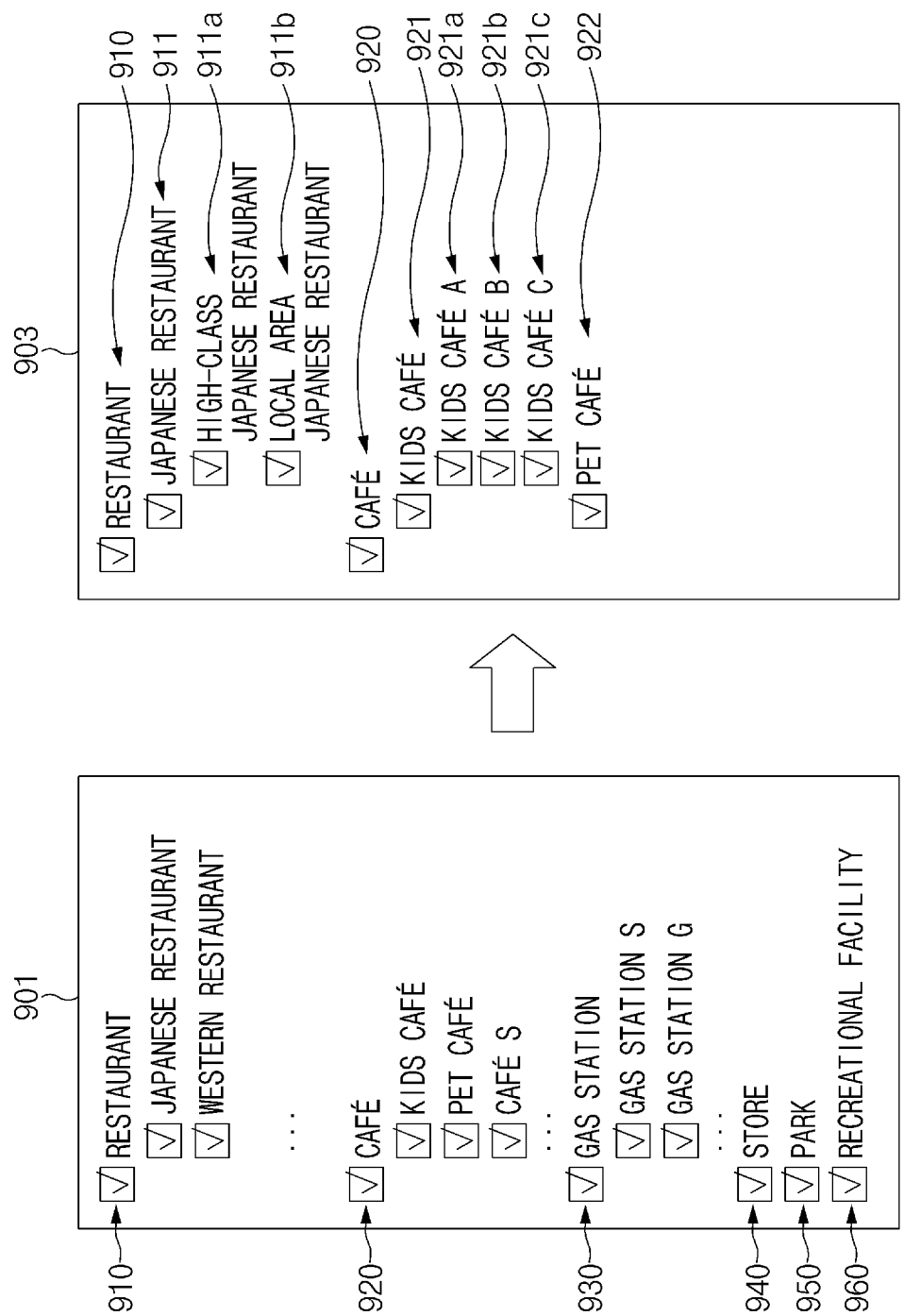
FIG. 9 is a diagram illustrating a user profile before and after learning a user interest pattern model in an electronic device, according to an embodiment.

FIG. 9 is a diagram illustrating a user profile before and after learning a user interest pattern model in an electronic device, according to an embodiment.

Referring to FIG. 9, the electronic device 101 may display a user profile on a display corresponding to a specific user input. A pre-learning user profile 901 may display all categories related to various items 910, 920, 930, 940, 950 and 960. A post-learning user profile 903 may display detailed categories 911, 911*a*, 911*b*, 921, 921*a*, 921*b*, 921*c* and 922 related to the recommended items 910 and 920.

According to an embodiment, an electronic device may include a communication module and a processor operatively connected to the communication module to exchange data with an external electronic device through the communication module. The processor may be configured to generate user data and a user profile based on collected user information related to a plurality of items, receive learning information data related to the plurality of items from the external electronic device, generate user learning data by applying the learning information data to the user data, learn a user preference pattern based on the user learning data, update the user profile based on the learned user preference pattern, and receive recommended item data from the external electronic device based on the updated user profile.

The user profile may include information related to an item type and a preference for each item.

The user profile may include a hierarchical structure of items.

The processor may be configured to update the user profile to reduce item types and increase sub-items of a selected item through learning of the user preference pattern.

The processor may be configured to exclude an item whose preference is less than or equal to a specified value from the user profile through learning of the user preference pattern.

The processor may be configured to update a preference of a selected item through learning of the user preference pattern.

The processor may be configured to update the user profile to reduce item types and increase a detail level of a selected item through learning of the user preference pattern.

The processor may be configured to change item types and an item detail level included in the user profile through learning of the user preference pattern.

The processor may be configured to request, from the external electronic device, the recommended item data of which the item type and the item detail level are changed based on the user profile.

The electronic device may further include a display. When a specified application is executed, the processor may be configured to display information about a first item as a first screen on the display based on the user profile before learning the user preference pattern, and display information about a second item that is on a lower layer than the first item as the first screen on the display based on a user profile after learning the user preference pattern.

The processor may be configured to transmit, to the external electronic device, information about an item type and a preference related to the recommended item data except for personal information of a user when the recommended item data is requested.

The processor may be configured to generate the user learning data by synthesizing the user data and the learning information data, and learn a user interest pattern by applying the user learning data to a previously stored user interest pattern model.

A data transmission amount of the recommended item data or the learning information data received from the external electronic device may be determined through an item type and an item preference included in the user profile.

The data transmission amount received from the external electronic device may be reduced through learning of the user preference pattern.

According to an embodiment, an electronic device may include a communication module and a processor operatively connected to the communication module to exchange data with an external electronic device through the communication module. The processor may be configured to receive a request for transmission of recommended item data from the external electronic device, and determine a data transmission amount of the recommended item data based on an item type and an item preference included in the request for transmission.

The processor may be configured to collect raw data on a plurality of items, and generate the recommended item data by arranging detailed information related to the plurality of items in a hierarchical structure corresponding to a specified criterion based on the raw data.

The processor may be configured to determine a detail level of transmission information for each item included in the recommended item data based on the item preference.

The processor may be configured to receive a request for transmission of learning information data from the external electronic device, and determine a data transmission amount of the learning information data based on the item type and the item preference included in the request for transmission.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B". "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium e.g., compact disc read only memory (CD-ROM)), or be distributed (e.g., downloaded or uploaded) online via an application store (e.g., PlayStore™), or between two user devices e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments in the disclosure, the electronic device may reduce the amount of data transmitted between the electronic device and the server by receiving only necessary information and excluding unnecessary information about the item from the server.

According to the embodiments in the disclosure, the electronic device may protect the user's personal information by providing metadata not related to the user's personal information to the server.

In addition, various effects that are directly or indirectly understood through the present disclosure may be provided.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device configured to request a recommended item to an external electronic device, the electronic device comprising:
   a display;
   a communication module; and
   a processor operatively connected to the communication module and the display, and to exchange data with the external electronic device through the communication module,
   wherein the processor is configured to:
   generate user data including a plurality of items and a user profile including information related to a preference for each of the plurality of items based on collected user activity information,
   receive learning information data related to the plurality of items from the external electronic device,
   generate user learning data by applying the learning information data to the user data,
   learn a user preference pattern based on the user learning data,
   update the user profile based on the learned user preference pattern,
   request, to the external electronic device, the recommended item based on the user data including the updated user profile, and
   receive recommended item data related to the updated user profile from the external electronic device,
   wherein, when a specified application is executed, the processor is further configured to:
   display information about a first recommended item data having a first detail level based on a first user profile before learning the user preference pattern, and
   display information about a second recommended data item having a second detail level that is higher than the first detail level as a first screen on the display based on a second user profile after learning the updated user preference pattern.

2. The electronic device of claim 1, wherein the user profile includes a hierarchical structure of items.

3. The electronic device of claim 2, wherein the processor is further configured to update the user profile to reduce item types and increase sub-items of a selected item through learning of the user preference pattern.

4. The electronic device of claim 1, wherein the processor is further configured to exclude an item whose preference is less than or equal to a specified value from the user profile through learning of the user preference pattern.

5. The electronic device of claim 1, wherein the processor is further configured to update a preference of a selected item through learning of the user preference pattern.

6. The electronic device of claim 1, wherein the processor is further configured to update the user profile to reduce item types and increase a detail level of a selected item through learning of the user preference pattern.

7. The electronic device of claim 1, wherein the processor is further configured to change an item type and an item detail level included in the user profile through learning of the user preference pattern.

8. The electronic device of claim 7, wherein the processor is further configured to request, from the external electronic device, the recommended item data of which the item type and the item detail level are changed based on the user profile.

9. The electronic device of claim 1, wherein the processor is further configured to:
 transmit, to the external electronic device, information about an item type and a preference related to the recommended item data except for personal information of a user when the recommended item data is requested.

10. The electronic device of claim 1, wherein the processor is further configured to:
 generate the user learning data by synthesizing the user data and the learning information data, and
 learn a user interest pattern by applying the user learning data to a previously stored user interest pattern model.

11. The electronic device of claim 1, wherein a data transmission amount of the recommended item data or the learning information data received from the external electronic device is determined through an item type and an item preference included in the user profile.

12. The electronic device of claim 11, wherein the data transmission amount received from the external electronic device is reduced through learning of the user preference pattern.

* * * * *